United States Patent Office.

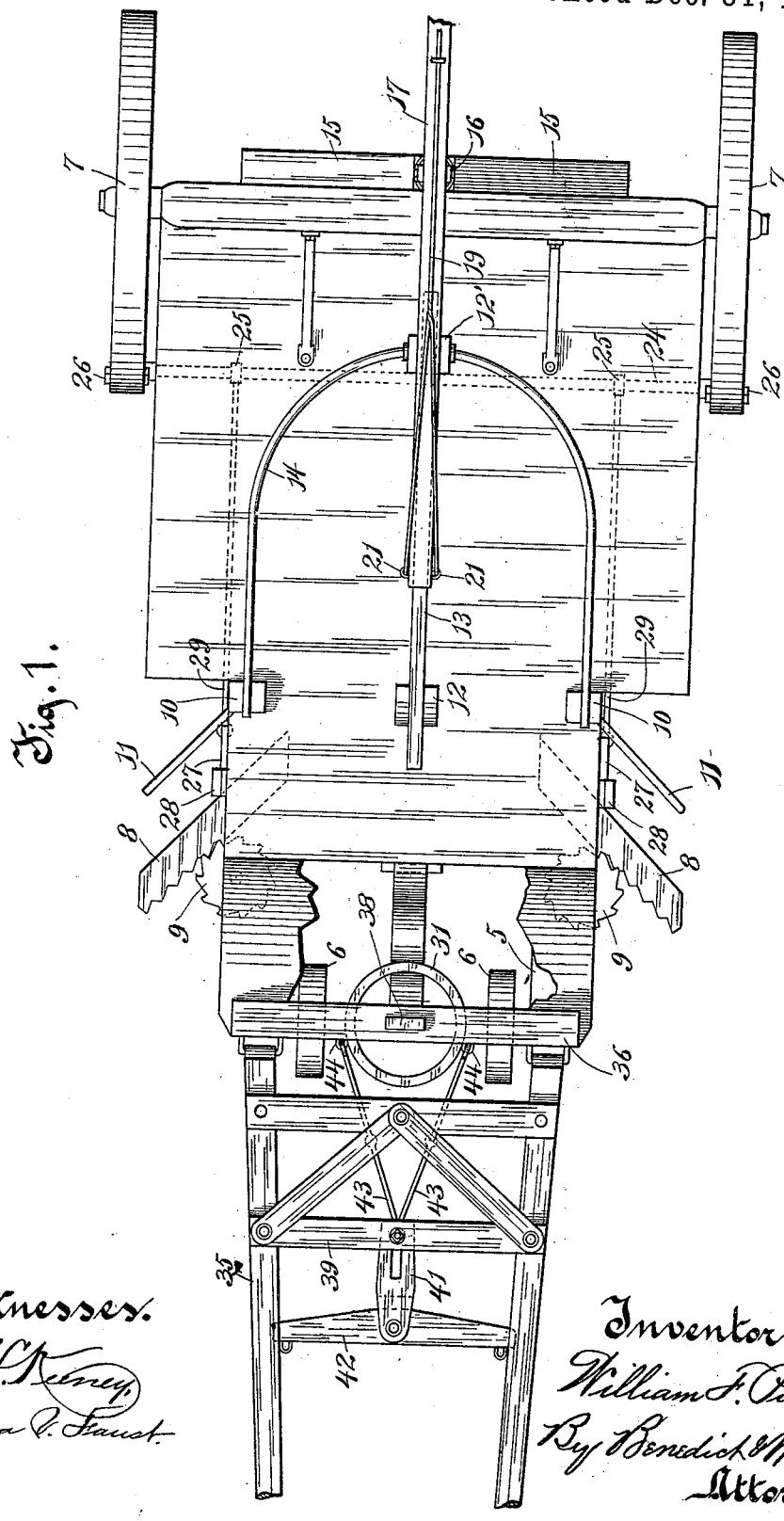

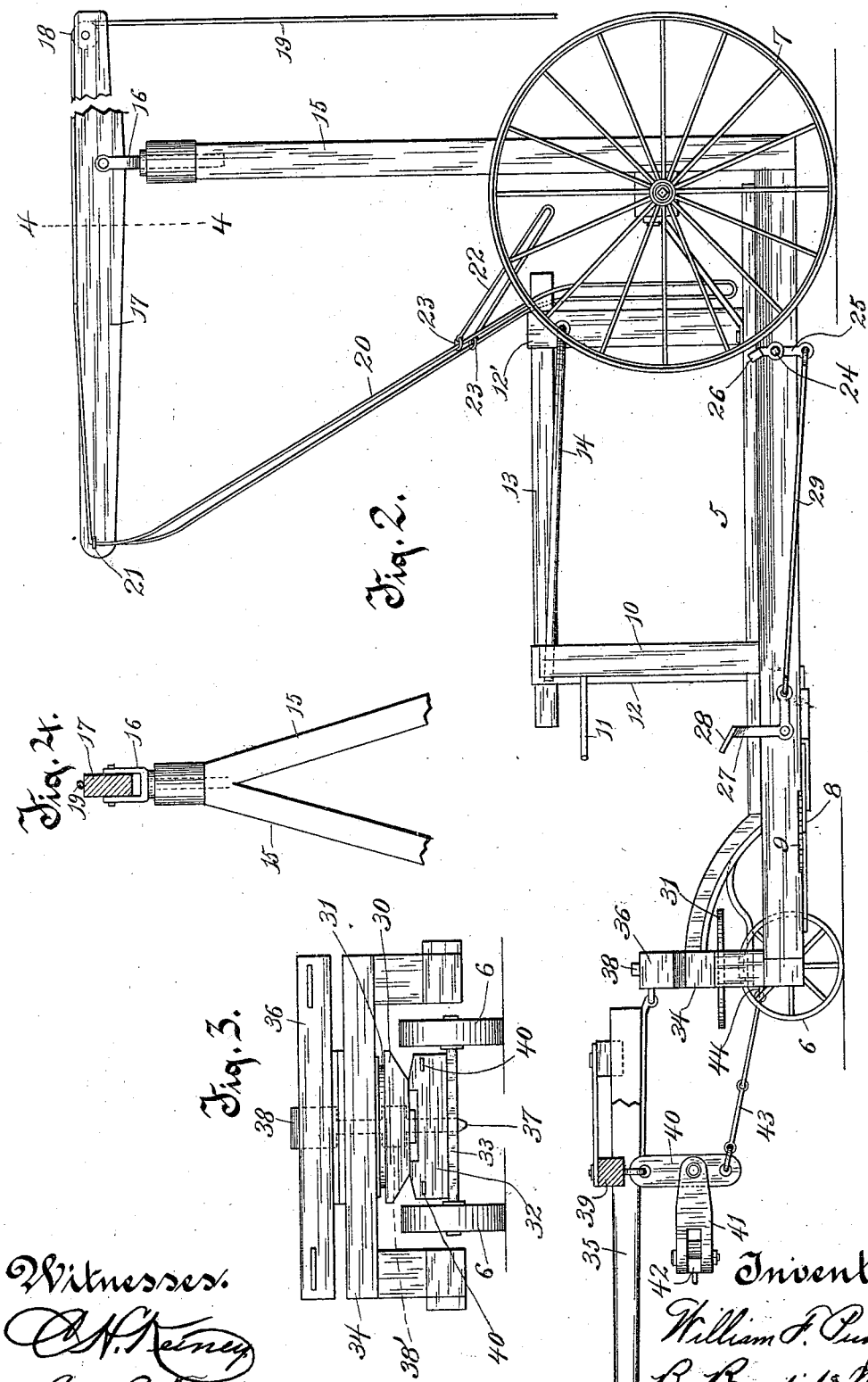

WILLIAM F. PUNZEL, OF LAKE MILLS, WISCONSIN.

CORN-HARVESTER.

SPECIFICATION forming part of Letters Patent No. 552,302, dated December 31, 1895.

Application filed May 2, 1895. Serial No. 547,874. (No model.)

*To all whom it may concern:*

Be it known that I, WILLIAM F. PUNZEL, of Lake Mills, in the county of Jefferson and State of Wisconsin, have invented a new and useful Improvement in Corn-Harvesters, of which the following is a description, reference being had to the accompanying drawings, which are a part of this specification.

My invention has relation to improvements in corn-harvesters.

The object is to provide an improved construction, whereby a most effectual cutting of the cornstalks is secured and at the same time provision made for conveniently collecting the stalks in a shock, tying the shock, and finally lifting the same from the harvester to the ground.

The invention further contemplates as an object an improvement in the running-gear of the harvester, which will be hereinafter fully described.

The invention consists of the devices and parts, or their equivalents, as hereinafter more fully set forth.

In the accompanying drawings, Figure 1 is a plan view of the complete device. Fig. 2 is a side elevation. Fig. 3 is a front elevation, and Fig. 4 is a cross-sectional view on the line 4 4 of Fig. 2.

Like numerals of reference denote like parts throughout the several views.

Referring to the drawings, the numeral 5 indicates the frame or body of my improved harvester mounted upon suitable front and rear wheels 6 and 7, respectively.

The front portion of the platform of the frame is somewhat narrower than the rear thereof, and secured beneath and upon opposite sides of this front portion and extending out obliquely therefrom are cutting-blades 8 8, having serrated cutting-edges. Adapted to coact with these cutting-blades are rotatable cutting-disks 9 9, having a series of peripheral cutting-teeth.

Projecting up from opposite sides of the front portion of the platform, just back of the cutting mechanism, are standards 10 10, and extending out obliquely from the upper ends of said standards are arms 11 11, which are adapted to engage the upper ends of the cornstalks and assist in gathering the same in toward the platform. Said platform has also extending upwardly therefrom front and rear standards 12 and 12', respectively, said standards being in longitudinal alignment and having their upper ends notched to receive removably a bar 13. The rear standard 12' has also passing freely through an eye therein the rear portion of a U-shaped rod or wire 14, the forward ends of which, when the rod or wire is in the position shown in Fig. 1, are adapted to be received in notches formed in the upper ends of the standards 10 10.

To the rear end of the machine is attached upwardly-extending inclined standards 15 15, the upper ends of which are joined and are provided with a swiveled bearing 16 for a lifting-lever 17. In the rear end of this lever is journaled a roller 18, over which passes a cord 19, the front portion of said cord being looped, as indicated at 20. Each side cord of this loop is passed through a staple or eye 21, one on each side of the front end of the lever.

The numeral 22 indicates an auxiliary cord, the inner ends of which are provided with eyes 23 23, through which the side cords of the loop 20 pass freely.

Journaled in bearings beneath the platform is a rock-shaft 24. The opposite ends of this shaft extend out slightly beyond the edges of the platform. At a little distance from its ends said shaft has mounted thereon crank-arms 25 25. The extreme outer ends of the shaft are provided with brake-shoes 26 26. Pivoted to the side bars of the frame are bell-crank levers 27 27, having their upper ends formed into foot-pieces 28 28. The horizontal members of these bell-crank levers are connected up to the crank-arms 25 by means of links 29 29. These parts constitute a brake mechanism whereby either of the attendants on the machine may, by applying the foot to the foot-piece 28, depress the bell-crank lever and thereby, through the link 29, cause the brake-shoe to bear firmly against the tire of the wheel.

In operation the machine traverses the ground between the rows of corn. Two persons stand upon the platform, upon opposite sides of the front portion thereof, and as the stalks are severed by the cutting mechanism gather them in onto the platform. These stalks are deposited in the two spaces formed by the removable bar 13, running longitudinally of the U-shaped rod or wire 14. The stalks incline over, so as to rest against the removable bar, whereby said bar serves to spread apart the butts of the stalks. As soon as the spaces are filled the upper ends of the stalks are firmly tied together. The loop 20 of cord 19 is now passed beneath the front end of bar 13, while the looped cord 22 is made to engage under the rear end of bar 13. The U-shaped wire is now thrown back, being capable of being turned freely in its eye. A pull is now given to the free end of the cord 19, and this has the effect of turning lever 17 on its pivot, and thereby raising the shock; and inasmuch as the bearing of the lever is swiveled said lever can be readily swung around until the desired position for depositing is reached, when the shock can, of course, be deposited butt down. After this the loops 20 and 22 are disengaged from the ends of the bar 13 and said bar then removed from the shock.

As stated, I contemplate, also, improvements in the running-gear of my device adapted particularly for securing a ready and easy turning of the machine. Referring now particularly to this part of my invention, the numeral 30 indicates a front bolster carrying a flat ring 31. Beneath the bolster is a block 32 secured to the axle 33. At the front of the machine is a cross-piece 34, beneath which the bolster is placed, the flat ring being interposed between the two. The numeral 35 indicates the thills, which have pivotally connected to their rear a transverse bar 36, which bar is adapted to be placed on top of the cross-piece 34.

The numeral 37 indicates a king-bolt, which passes through the transverse bar 36, cross-piece 34, bolster 30, block 32 and axle 33. The portions of this king-bolt which pass through the transverse bar 36 and bolster 30 are enlarged, as indicated at 38 38', the openings, of course, of the bar and bolster being correspondingly enlarged. These enlargements have the effect of causing the bar 36 and bolster 30 to turn concurrently.

Pivoted to and depending from the under side of a cross-piece 39 of the thills is an arm 40. To this arm, in turn, is pivoted a second arm 41, which carries at its forward end a whiffletree 42. The lower end of arm 40 is connected up to block 32 by means of links 43 43, said links engaging staples 44 44 in said block.

It will be understood, of course, that the traces of the harness are secured to the ends of the whiffletree, so that the draft is directly on said whiffletree. The pulling, therefore, is accomplished by said whiffletree with the assistance offered by whatever pull there is on the thills occasioned by the connection of the arm 40 therewith. The turning, it will be obvious, is occasioned almost entirely by the pressure of the animal against the thills, which turning, it will be evident from the construction shown, can be most readily and easily accomplished.

Having thus described my invention, what I claim, and desire to secure by Letters Patent, is—

1. In a corn harvester, the combination, of a frame, cutting mechanism, standards extending upwardly from said frame, a bar supported by the standards, a U-shaped wire pivoted to one of the standards, and means for supporting the free ends of the U-shaped wire, substantially as set forth.

2. In a corn harvester, the combination, of a frame, standards extending upwardly therefrom, a bar supported by the standards, cutting mechanism, an upright support, a lever having a swiveled pivotal connection with said support, and a cord carried by the lever and having one end formed into loops, said loops adapted to engage under the ends of the bar, substantially as described.

3. In a corn harvester, the combination, of a frame, cutting mechanism, standards extending upwardly from the frame, a bar removably supported by said standards, a U-shaped wire pivotally connected to one of the standards, other standards adapted to support the free ends of the U-shaped wire, upwardly-extending inclined standards, a lever having a swiveled pivotal connection with the upper ends of said inclined standards, and a cord carried by the lever and provided with a loop adapted to be passed beneath the ends of the removable bar and around the stalks, substantially as set forth.

4. The combination of a front axle, a bolster above the same, an upper cross-piece at the front of the frame, thills, a transverse bar pivoted to the rear of the thills, and a king-bolt passing through said rear bar of the thills, through the upper cross-piece of the frame, through the bolster, and through the axle, the portions of said king-bolt which pass through the pivoted transverse bar and through the bolster being enlarged, substantially as set forth.

In testimony whereof I affix my signature in presence of two witnesses.

WILLIAM F. PUNZEL.

Witnesses:
C. F. GREENWOOD,
A. W. GREENWOOD.